US009557620B2

(12) United States Patent  
Sun

(10) Patent No.: US 9,557,620 B2
(45) Date of Patent: Jan. 31, 2017

(54) TFT ARRAY SUBSTRATE AND DISPLAY DEVICE WITH TILT ANGLE BETWEEN STRIP-LIKE PIXEL ELECTRODES AND DIRECTION OF INITIAL ALIGNMENT OF LIQUID CRYSTALS

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventor: Rongge Sun, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 369 days.

(21) Appl. No.: 13/704,684

(22) PCT Filed: Nov. 8, 2012

(86) PCT No.: PCT/CN2012/084335
§ 371 (c)(1),
(2) Date: Dec. 17, 2012

(87) PCT Pub. No.: WO2013/071840
PCT Pub. Date: May 23, 2013

(65) Prior Publication Data
US 2013/0120680 A1    May 16, 2013

(30) Foreign Application Priority Data
Nov. 15, 2011   (CN) .......................... 2011 1 0362219

(51) Int. Cl.
*G02F 1/1343*   (2006.01)
*G02F 1/136*   (2006.01)
(Continued)

(52) U.S. Cl.
CPC ........ *G02F 1/1368* (2013.01); *G02F 1/133707* (2013.01); *G02F 1/133784* (2013.01); *G02F 2001/133761* (2013.01)

(58) Field of Classification Search
CPC ................... G02F 1/134363; G02F 1/133707; G02F 1/13439; G02F 1/1362; G02F 2001/133749
(Continued)

(56) References Cited

U.S. PATENT DOCUMENTS 5,870,160 A * 2/1999 Yanagawa ......... G02F 1/134363
349/110
6,646,707 B2 * 11/2003 Noh et al. ...................... 349/141
(Continued)

FOREIGN PATENT DOCUMENTS

CN    1359026 A    7/2002
CN    1523435 A    8/2004
(Continued)

OTHER PUBLICATIONS

First Chinese Office Action dated Sep. 13, 2013; Appln. No. 201110362219.2.
(Continued)

*Primary Examiner* — Huyen Ngo
(74) *Attorney, Agent, or Firm* — Ladas & Parry LLP

(57) ABSTRACT

A thin film transistor (TFT) array substrate comprising a sub-pixel unit is disclosed. The sub-pixel unit includes a thin film transistor device, a first pixel electrode layer and a second pixel electrode layer; the first pixel electrode layer is configured as a common electrode, the second pixel elec- (Continued)

trode layer is connected to a source electrode or a drain electrode of the thin film transistor, and the first pixel electrode layer is insulated from the second pixel electrode layer; the second pixel electrode layer is located over the first pixel electrode layer, and strip-like pixel electrodes of the second pixel electrode layer overlap the first pixel electrode layer; and strip-like pixel electrodes of the second pixel electrode layer which are extended along a straight line make a tilt angle with an initial alignment of liquid crystals, and a data line is parallel to one of the strip-like pixel electrodes close to the data line. A phenomenon of orientation disorder of liquid crystals will not occur at an edge of pixel from influence of disordered electric fields.

8 Claims, 6 Drawing Sheets

(51) Int. Cl.
   *G02F 1/1368* (2006.01)
   *G02F 1/1337* (2006.01)
(58) Field of Classification Search
   USPC .......................................... 349/43, 46, 141
   See application file for complete search history.

(56) References Cited

U.S. PATENT DOCUMENTS

| | | | | |
|---|---|---|---|---|
| 6,958,799 | B2* | 10/2005 | Tomioka et al. | 349/141 |
| 7,626,667 | B2* | 12/2009 | Lee et al. | 349/141 |
| 7,724,337 | B2* | 5/2010 | Konno | 349/141 |
| 8,330,922 | B2* | 12/2012 | Matsushima et al. | 349/141 |
| 2002/0041354 | A1 | 4/2002 | Noh et al. | |
| 2004/0109099 | A1 | 6/2004 | Lee et al. | |
| 2007/0030428 | A1* | 2/2007 | Lu | G02F 1/1337 349/126 |
| 2009/0128727 | A1* | 5/2009 | Yata | G02F 1/134363 349/46 |
| 2009/0296037 | A1 | 12/2009 | Tanaka et al. | |
| 2010/0079712 | A1* | 4/2010 | Tanaka | G02F 1/133512 349/123 |
| 2010/0296040 | A1* | 11/2010 | Han | G02F 1/134363 349/139 |
| 2011/0058115 | A1* | 3/2011 | Matsushima | G02F 1/1323 349/42 |
| 2012/0120328 | A1* | 5/2012 | Lu | G02F 1/134363 349/1 |

FOREIGN PATENT DOCUMENTS

| | | |
|---|---|---|
| CN | 101592813 A | 12/2009 |
| CN | 102629056 A | 8/2012 |

OTHER PUBLICATIONS

Second Chinese Office Action dated Feb. 8, 2014; Appln. No. 201110362219.2.
Chinese Rejection Decision dated May 5, 2014; Appln. No. 201110362219.2.
International Preliminary Report on Patentability dated May 20, 2014 PCT/CN2012/084335.
International Search Report; mailed Jul. 2, 2013; PCT/CN2012/084335.

* cited by examiner

TFT ARRAY SUBSTRATE AND DISPLAY DEVICE WITH TILT ANGLE BETWEEN STRIP-LIKE PIXEL ELECTRODES AND DIRECTION OF INITIAL ALIGNMENT OF LIQUID CRYSTALS

TECHNICAL FIELD

Embodiments of the present invention relate to a thin film transistor (TFT) array substrate and display device.

BACKGROUND

TN, IPS, VA and ADS are several modes of liquid crystal display. ADS is the abbreviation for Advanced Super Dimension Switch (ADSDS), i.e., an advanced super dimension switch technology, in which a multi-dimensional electric field is formed by an electric field produced at edges of slit electrodes on a same plane and an electric field produced between a layer of the slit electrodes and a layer of a plate-like electrode, and allows liquid crystal molecules in all orientations in a liquid crystal cell, which are located directly above the electrode and between the slit electrodes, to be rotated, thereby enhancing the work efficiency of liquid crystals and increasing the transmissive efficiency. The Advanced Super Dimensional Switch technology can improve the picture quality of TFT products, and has advantages of high resolution, high transmittance, low power consumption, wide viewing angle, high aperature ratio, low chromatic aberration, and push Mura-free, etc.

In manufacturing an array substrate of a TFT liquid crystal display in an ADS mode, the first layer is a transparent pixel electrode layer (usually indium tin oxide (ITO)), i.e., the above plate-like electrode; subsequently, a gate metal layer, a source-drain metal electrode layer and a second pixel electrode layer (usually also ITO) are formed in sequence, and the second pixel electrode layer is the above slit-like electrode. For the sake of illustrative convenience, a plurality of strip-like structures with a certain width and interval in the second pixel electrode layer are called as strip-like pixel electrodes. These strip-like structures and openings between the strip-like structures form the slit-like electrodes.

The TFT pixel structure in the ADS mode has ever been in evolving. An early stage structure was a single domain structure, as shown in FIG. 1. The single domain pixel structure comprises: a gate line 102, a data line 103, a second pixel electrode layer 101, and strip-like pixel electrodes 101a located on the second pixel electrode layer 101 and openings 101b of the second pixel electrode layer. The gate line 102 and the data line 103 intersect each other to define a sub-pixel unit. The data line 103 is connected to a drain electrode 103a of a TFT, and a source electrode 103b of the TFT is connected to the second pixel electrode layer 101. Strip-like pixel electrodes within the same sub-pixel have a same direction in the figure.

Later, a two domain structure was proposed. In the two domain structure, a sub-pixel can be divided into two parts of left and right, and strip-like pixel electrodes for the two parts are bilaterally symmetric, so that chromatic aberration can be further decreased. However, black vertical stripes occur at the junction of two domains at the center of the sub-pixel.

Later, a pixel structure design was proposed by US Patent Application Publication No. US 2002/0041354, as shown in FIG. 2. The pixel unit also has a two domain structure and is divided into two parts of upper and lower, and strip-like pixel electrodes for the two parts are longitudinally symmetric, so that an effect of low chromatic aberration is obtained, and at the same time, a black-stripe region at the junction of domains is reduced and the transmissive characteristic is enhanced.

However, the forgoing existing technologies did not resolve black stripes at edges of pixels. At an edge of a pixel unit in the ADS mode, due to a disturbed electric field produced by a gate line or a data line and an influence brought by a pixel-electrode edge per se, the electric field direction in this place is inconsistent with direction of the fringe field for driving liquid crystals inside the pixel unit, so that an orientation disorder of liquid crystals occurs at the edge of the pixel unit. A, B shown in FIGS. 1 and 2 are regions of the orientation disorder of liquid crystals in the neighborhood of data lines and gate lines, respectively. Presence of the black stripes will affect transmittance and response speed of the display panel. For improving the display effect, a wider black matrix is usually prepared on an opposed color filter substrate so as to shield the regions of the orientation disorder, which causes degradation of the aperture ratio. Thus, transmittance is reduced.

SUMMARY

Embodiments of the present invention can overcome the defect that there are too many black-stripe regions at edges of pixels, thereby enhancing aperature ratio and transmittance.

In one aspect of the present invention, there is provided a TFT array substrate, comprising: a gate line and a data line, which are formed on a substrate, and a sub-pixel unit defined by intersecting of the gate line and the data line, wherein the sub-pixel unit comprises a thin film transistor device, a common electrode, a first pixel electrode layer and a second pixel electrode layer; wherein one of the first pixel electrode layer and the second pixel electrode layer is connected to the common electrode, the other one of the pixel electrode layers is connected to a source electrode or a drain electrode of the thin film transistor, and the first pixel electrode layer and the second pixel electrode layer are separated by an insulating layer; the second pixel electrode layer is located over the first pixel electrode layer, and the pattern of strip-like pixel electrodes of the second pixel electrode layer overlap up-and-down with the pattern of the first pixel electrode layer; and the strip-like pixel electrodes make a tilt angle with an initial orientation of liquid crystals, and a gate line or a data line is parallel to the strip-like pixel electrodes close to the gate line or the data line.

As to the TFT array substrate, for example, the tilt angle is 3°~15°.

As to the TFT array substrate, for example, the tilt angle is 7°~12°.

As to the TFT array substrate, for example, the strip-like pixel electrodes of the second pixel electrode layer are parallel to each other. For example, the gate line is parallel to the strip-like pixel electrodes of the second pixel electrode layer, and the data line is perpendicular to the initial orientation of liquid crystals. Or, for example, the data line is parallel to the strip-like pixel electrodes of the second pixel electrode layer, and the gate line is perpendicular to the initial orientation of liquid crystals.

As to the TFT array substrate, for example, the strip-like pixel electrodes of the second pixel electrode layer are divided into two sets which are symmetric to each other. For example, the gate line is parallel to one of the sets of the strip-like pixel electrodes in the second pixel electrode layer, which are close to the gate line, and the data line is perpendicular to the initial orientation of liquid crystals. Or, a first part of the data line is parallel to one set of the strip-like pixel electrodes in the second pixel electrode layer, which is close to the first part, a second part of the data lines are parallel to the other set of the strip-like pixel electrodes in the second pixel electrode layer, which is close to the second part, and the gate line is perpendicular to the initial orientation of liquid crystals.

For example, the TFT array substrate may comprise a plurality of gate lines, a plurality of data lines, and a plurality of sub-pixels defined by intersecting of the plurality of gate lines and the plurality of data lines, wherein along the direction of the initial orientation of liquid crystals, the strip-like pixel electrodes in two adjoining sub-pixel units are symmetric to each other with respect to a gate line or data line therebetween, and along a direction perpendicular to the initial orientation of liquid crystals, the strip-like pixel electrodes in two adjoining sub-pixel units, which adjoin, are parallel to each other.

As to the TFT array substrate, for example, the first pixel electrode layer comprises a plate-like electrode.

In another aspect of the invention, there is further provided a display device, an array substrate in the display device is the TFT array substrate as stated above.

According to embodiments of the invention, by means of making direction of the gate line or data line parallel to that of a neighbor pixel electrode, direction of a disturbed electric field for the gate line or data line are made to be consistent with direction of a fringe field within a pixel unit; and meanwhile, because the pixel-electrode edge in the neighborhood of the gate line or the data line is parallel to the inside strip-like pixel electrodes, the electric field direction at the edge of the pixel unit is made to be consistent with direction of the fringe field within the pixel unit. As such, regions of orientation disorder of liquid crystals at the edge of the pixel unit are reduced, and aperture ratio and transmissive characteristic of the pixel unit are improved. According to the embodiments of the invention, a higher aperture ratio and transmittance can be achieved without adding process steps, thereby enhancing optical utilization ratio, reducing costs and power consumption of a backlight source, and obtaining an effect of more green and environmental protection, compared with the prior art.

BRIEF DESCRIPTION OF THE DRAWINGS

To illustrate technical solutions in embodiments of the present invention more clearly, accompanied drawings will be briefly introduced below. Obviously, the accompanied drawings described below merely relate to some embodiments of the present invention, and are not limitation on the present invention.

DETAILED DESCRIPTION

In order to make objects, technical details and advantages of the embodiments of the invention apparent, hereinafter, technical solutions in embodiments of the present invention will be clearly and fully described in combination with the accompanied drawings in the embodiments of the present invention. Apparently, the embodiments to be described are merely a part but not all of embodiments of the present invention. Every other embodiment as would be obvious to those ordinarily skilled in the art on the basis of described embodiments in the present invention without creative work, comes within the protection scope of the present invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at lease one. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

The array substrate of the embodiment of the present invention includes a plurality of gate lines and a plurality of data lines which intersect each other to define a pixel units arranged in an array, each pixel unit comprising a thin film transistor as a switch element, and a pixel electrode and a common electrode for controlling orientation of liquid crystal. For example, a gate electrode of the thin film transistor in each pixel is electrically connected to or integrally formed with a corresponding gate line, a source electrode thereof is connected to or integrally formed with a corresponding data line, and a drain electrode thereof is connected to or integrally formed with a corresponding pixel electrode. The following description is mainly connected with one or more pixel units, but other pixel units can be formed similarly.

Embodiment 1

Figure 1:
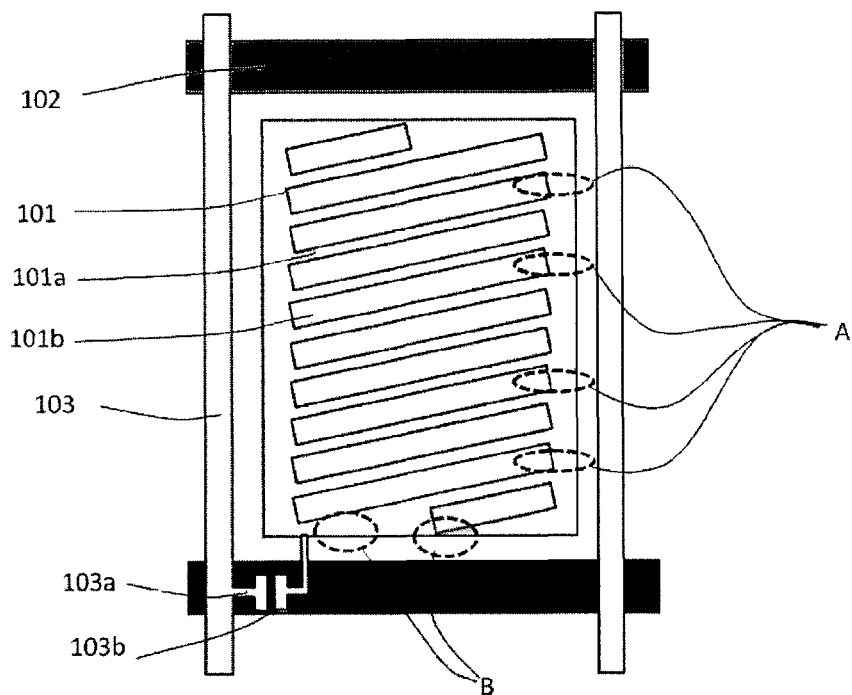
FIG. 1 is a schematic view illustrating the structure of a TFT array substrate in prior art.
Figure 2:
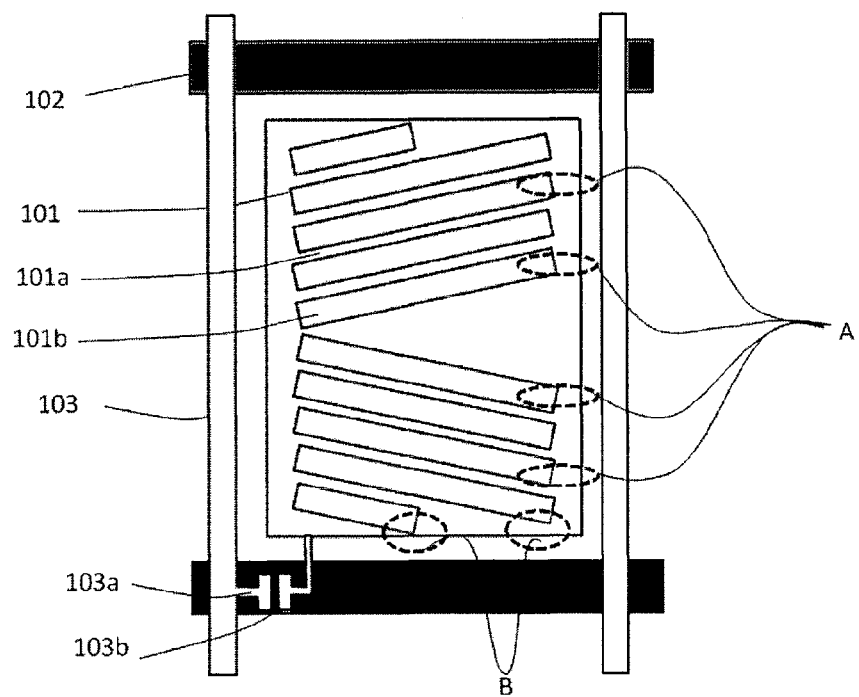
FIG. 2 is a schematic view illustrating the structure of another kind of TFT array substrate in prior art.
Figure 3:
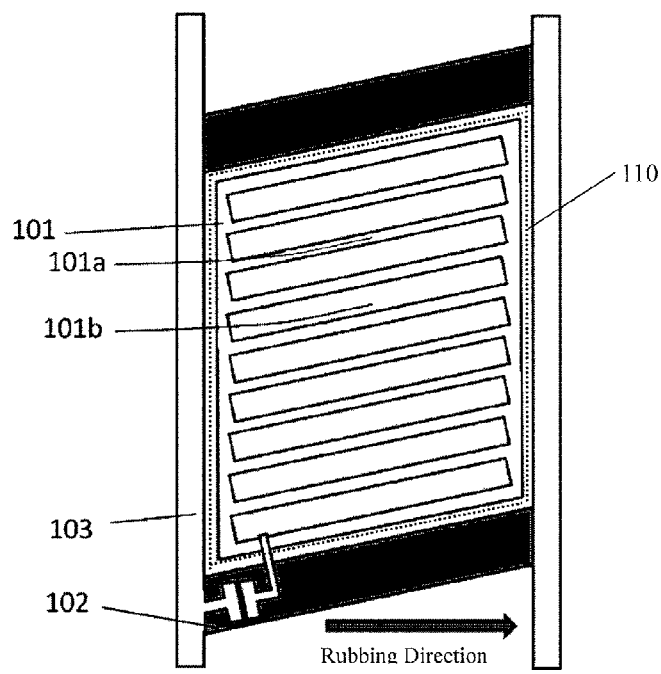
FIG. 3 is a schematic view illustrating a sub-pixel structure in a TFT array substrate according to an embodiment of the invention.
Figure 11:
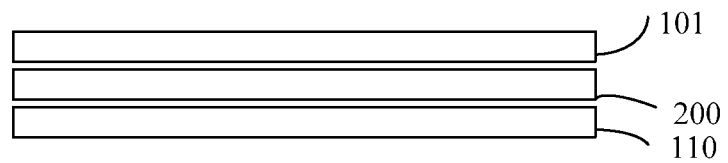
FIG. 11 is a schematic view illustrating the structure of stacked layers.

FIG. 3 is a schematic view illustrating the structure of a single sub-pixel in a TFT array substrate structure according to the invention. The array substrate comprises a plurality of gate lines 102 and a plurality of data lines 103 which are formed on a base substrate (not shown in the figure); and a plurality of sub-pixel units defined by intersecting each other of these gate lines 102 and data lines 103, each of the sub-pixel units comprising a thin film transistor device as a switching element and a common electrode, a first pixel electrode layer 110 and a second pixel electrode layer 101. The first pixel electrode layer 110, as shown by a broken-line in FIG. 3, comprises a plate-like electrode, for example. On the second pixel electrode layer 101, there are strip-like pixel electrodes 101a and openings 101b of the second pixel electrode layer 101. One of the first pixel electrode layer 110 and the second pixel electrode layer 101 is connected to the common electrode, the other one of the pixel electrode layers is connected to a source electrode or a drain electrode of the thin film transistor, and, as illustrated in FIG. 11, the first pixel electrode layer 110 and the second pixel electrode layer 101 are separated by an insulating layer 200. The second pixel electrode layer 101 is located over the first pixel electrode layer 110, and the pattern of the strip-like pixel electrodes 101a of the second pixel electrode layer 101 overlap up-and-down with the pattern of the first pixel electrode layer 110.

In the embodiment, an alignment layer located on the array substrate is, for example, rubbed in a horizontal direction as shown in FIG. 3, so that the initial orientation of liquid crystals is horizontal. A plurality of strip-like pixel electrodes 101a each are parallel to each other, the gate lines 102 are parallel to the strip-like pixel electrodes 101a, the direction of the data lines 103 is perpendicular to the initial orientation of liquid crystals, and the entire second pixel electrode layer 101 takes the shape of parallelogram. The strip-like pixel electrodes 101a make a tilt angle of 3°~15°, preferably 7°~12°, such as 9°, 10°, with respect to the initial orientation of liquid crystals.

Such a design makes direction of a disturbed electric field produced by the gate lines 102 consistent with direction of a fringe field for driving the liquid crystals within the pixel units, and meanwhile, pixel-electrode edges close to the gate lines 102 are parallel to the inside strip-like pixel electrodes 101a. This will not cause a phenomenon of orientation disorder of liquid crystals at edges of the pixel units due to influence of disordered electric fields, and will cause no black stripes to occur in the neighborhood of the gate lines 102. Accordingly, a width of a black matrix in a corresponding place on a color filter substrate can be decreased, and aperture ratio and transmittance are enhanced.

Figure 4:
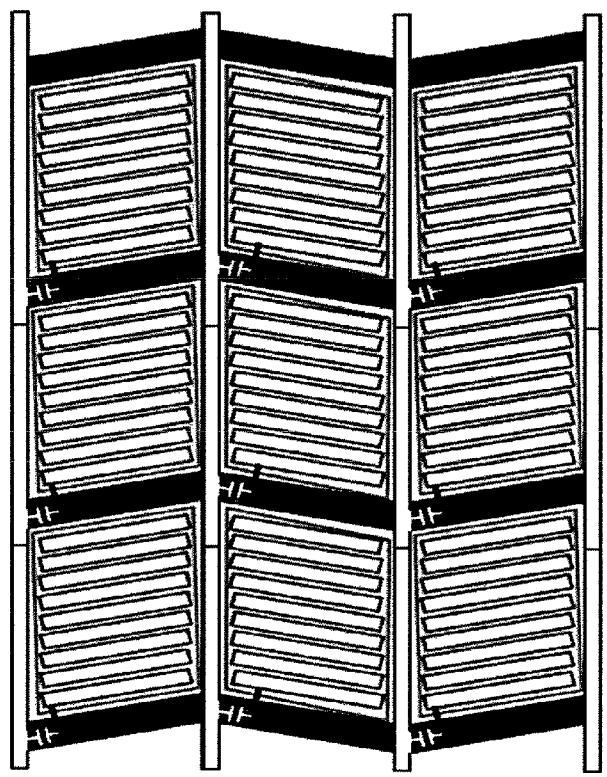
FIG. 4 is a schematic view illustrating an array substrate containing nine sub-pixel structures as shown in FIG. 3.

As shown in FIG. 4, it is a TFT array substrate produced by utilizing the TFT pixel structure shown in FIG. 3, and nine sub-pixel structures shown in FIG. 3 are presented in the figure. Along the direction of the initial orientation of liquid crystals (i.e., a horizontal direction in the figure), the strip-like pixel electrodes in two adjoining sub-pixel structures are symmetric to each other with respect to a data line interposed therebetween; and along a direction perpendicular to the initial orientation of liquid crystals (i.e., a perpendicular direction in the figure), the strip-like pixel electrodes in two adjoining sub-pixel structures are parallel to each other.

Embodiment 2

Figure 5:
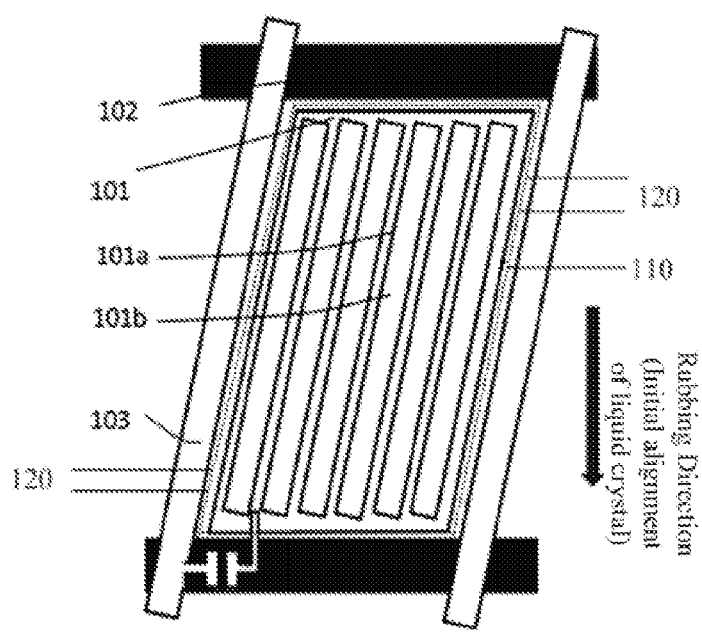
FIG. 5 is a schematic view illustrating a sub-pixel structure in another kind of TFT array substrate according to an embodiment of the invention.

As shown in FIG. 5, it differs from Embodiment 1 in that: an alignment layer located on an array substrate is, for example, rubbed in a perpendicular direction as shown in FIG. 5, so that the initial orientation of liquid crystals is a vertical direction, data lines 103 are parallel to strip-like pixel electrodes 101a, the direction of gate lines 102 is perpendicular to the initial orientation of the liquid crystals, and entire second pixel electrode layer 101 takes the shape of parallelogram.

Such a design makes direction of a disturbed electric field produced by the data lines 103 consistent with direction of a fringe field for driving the liquid crystals within the pixel units, and meanwhile, pixel-electrode edges close to the data lines 103 are parallel to the inside strip-like pixel electrodes 101a. This will not cause a phenomenon of orientation disorder of liquid crystals at edges of the pixel units due to influence of disordered electric fields, and will cause no black stripe to occur in the neighborhood of the data lines 103. Accordingly, a width of a black matrix in a corresponding place on a color filter substrate can be decreased, and aperture ratio and transmittance are enhanced.

Figure 6:
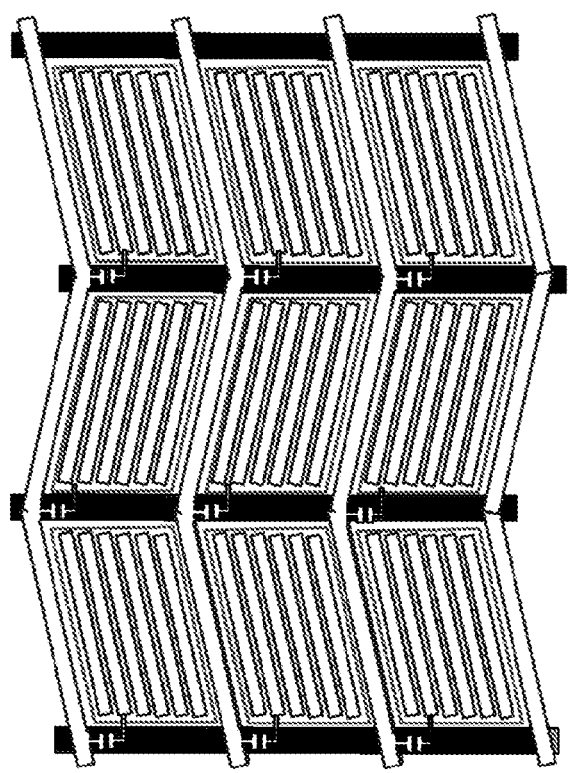
FIG. 6 is a schematic view illustrating an array substrate containing nine sub-pixel structures as shown in FIG. 5.

As shown in FIG. 6, it is an array substrate produced by utilizing the TFT pixel structure shown in FIG. 5, and nine sub-pixel structures shown in FIG. 5 are presented in the figure. Along the direction of the initial orientation of liquid crystals (i.e., a perpendicular direction in the figure), the strip-like pixel electrodes in two adjoining sub-pixel structures are symmetric to each other with respect to a gate line interposed therebetween; and along a direction perpendicular to the initial orientation of liquid crystals (i.e., a horizontal direction in the figure), the strip-like pixel electrodes in two adjoining sub-pixel structures are parallel to each other.

Embodiment 3

Figure 7:
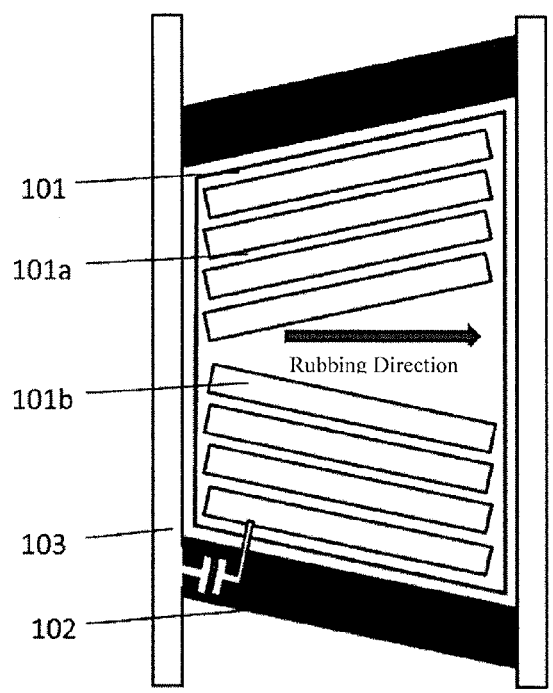
FIG. 7 is a schematic view illustrating a sub-pixel structure in another kind of TFT array substrate according to an embodiment of the invention.

As shown in FIG. 7, it differs from Embodiment 1 in that: in each of sub-pixel units, the plurality of strip-like pixel electrodes 101a on the second pixel electrode layer 101 are divided into two sets which are symmetric to each other with respect to the central line of the sub-pixel unit for example, and respective strip-like pixel electrodes 101a in each of the sets are parallel to each other. Each of the two gate lines 102 surrounding the sub-pixel unit is parallel to the corresponding one of the sets of the strip-like pixel electrodes 101a close to the gate lines in the second pixel electrode layer, so that entire second pixel electrode layer 101 of the sub-pixel unit take the shape of trapezoid.

In the embodiment, an alignment layer located on an array substrate is, for example, rubbed in a horizontal direction as shown in FIG. 7, so that the initial orientation of liquid crystals is horizontal.

Such a design makes direction of a disturbed electric field produced by the gate lines 102 consistent with direction of a fringe field for driving the liquid crystals within the pixel units, and meanwhile, pixel-electrode edges close to the gate lines 102 are parallel to the inside strip-like pixel electrodes 101a. This will not cause a phenomenon of orientation disorder of liquid crystals at edges of the pixel units due to influence of disordered electric fields, and will cause no black stripe to occur in the neighborhood of the gate lines 102. Accordingly, width of a black matrix in a corresponding place on a color filter substrate can be decreased, and aperture ratio and transmittance are enhanced. As compared with Embodiments 1 and 2, the strip-like pixel electrodes 101a are divided into two sets, and an advantage of lower chromatic aberration is provided over one set of strip-like pixel electrodes 101a.

Figure 8:
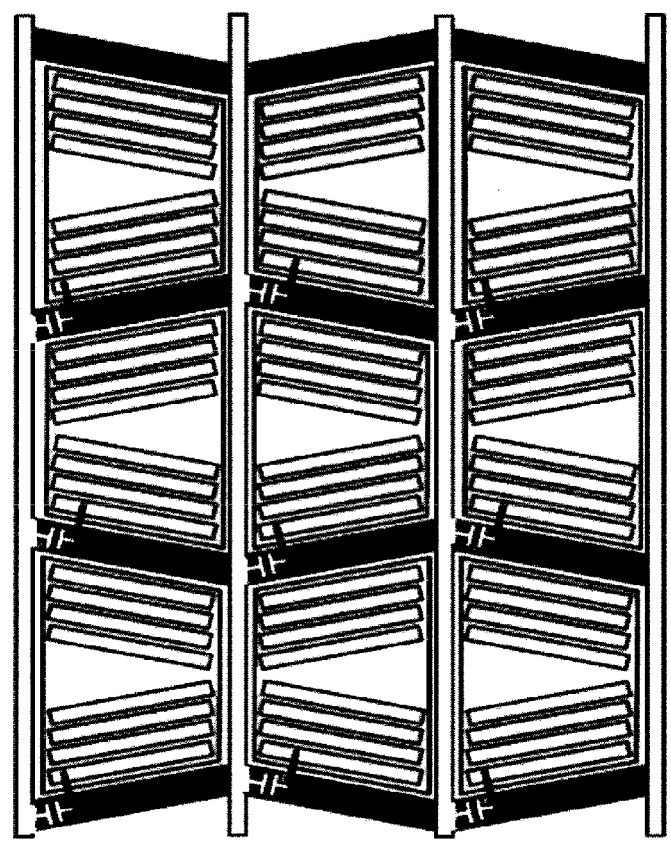
FIG. 8 is a schematic view illustrating an array substrate containing nine sub-pixel structures as shown in FIG. 7.

As shown in FIG. 8, it is an array substrate produced by utilizing the TFT pixel structure shown in FIG. 7, and nine sub-pixel structures shown in FIG. 7 are shown in the figure.

Along the direction of the initial orientation of liquid crystals (i.e., a horizontal direction in the figure), the strip-like pixel electrodes in two adjoining sub-pixel structures are symmetric to each other with respect to a data line therebetween; and along a direction perpendicular to the initial orientation of liquid crystals (i.e., a perpendicular direction in the figure), the strip-like pixel electrodes in two adjoining sub-pixel structures are parallel to each other.

Embodiment 4

Figure 9:
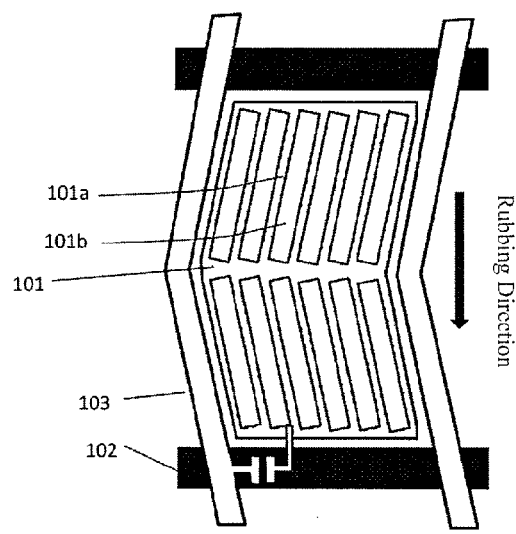
FIG. 9 is a schematic view illustrating a sub-pixel structure in another kind of TFT array substrate according to an embodiment of the invention.

As shown in FIG. 9, it differs from Embodiment 3 in that: an alignment layer located on an array substrate is, for example, rubbed in a perpendicular direction, so that the initial orientation of liquid crystals is a vertical direction. Data lines 103 are parallel to strip-like pixel electrodes 101a, and the direction of gate lines 102 is perpendicular to the initial orientation of liquid crystals. Because two sets of the strip-like pixel electrodes 101a are distributed symmetrically with respect to the central line of a sub-pixel unit in the perpendicular direction, the portions of two data lines 103 surrounding the sub-pixel unit on two sides, which correspond to the sub-pixel unit, are bent to be two sections, so that entire second pixel electrode layer 101 of the sub-pixel unit take the shape of hexagon.

Such a design makes direction of a disturbed electric field produced by the data lines 103 consistent with direction of a fringe field for driving the liquid crystals within the pixel units, and meanwhile, pixel-electrode edges close to the data lines 103 are parallel to the inside strip-like pixel electrodes 101a. This will not cause a phenomenon of orientation disorder of liquid crystals at edges of the pixel units due to influence of disordered electric fields, and will cause no black stripe to occur in the neighborhood of the data lines 103. Accordingly, a width of a black matrix in a corresponding place on a color filter substrate can be decreased, and aperture ratio and transmittance are enhanced.

Figure 10:
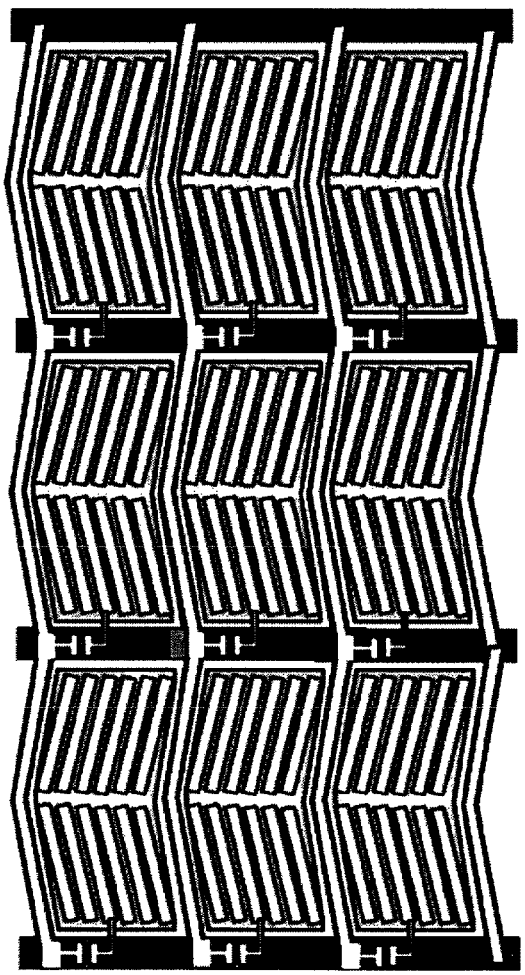
FIG. 10 is a schematic view illustrating an array substrate containing nine sub-pixel structures as shown in FIG. 9.

As shown in FIG. 10, it is an array substrate produced by utilizing the TFT pixel structure shown in FIG. 9, and nine sub-pixel structures shown in FIG. 9 are shown in the figure. Along the direction of the initial orientation of liquid crystals (i.e., a perpendicular direction in the figure), the strip-like pixel electrodes in two adjoining sub-pixel structures are symmetric to each other with respect to a gate line therebetween; and along a direction perpendicular to the initial orientation of liquid crystals (i.e., a horizontal direction in the figure), the strip-like pixel electrodes in two adjoining sub-pixel structures are parallel to each other.

Embodiment 5

According to the invention, there is further provided a display device, such as a liquid crystal panel, a liquid crystal television, a cell phone, a liquid crystal display, a digital photo frame, and so on, which further comprises an opposed substrate. An example of the opposed substrate is a color filter substrate, and color-filter sub-pixel units, which are useful for pixel points for displaying colors (such as red, green and blue), are formed on the color filter substrate in correspondence to sub-pixel units on an array substrate. However, some display devices, such as electronic paper display devices, do not need a color filter substrate besides an array substrate, and the opposed substrate is for example a transparent glass or plastic substrate.

The array substrate in these display devices is any one of the TFT array substrates in the foregoing Embodiments 1~4.

Various modifications and variances can also be made by those ordinarily skilled in the related technical field without departing from the spirit and scope of the present invention, and thus all the equivalent technical solutions also come within the scope of the present invention. The patent protection scope of the present invention shall be defined by the following claims.

The invention claimed is:

1. A thin film transistor (TFT) array substrate, comprising:
   a gate line and a data line, which are formed on a substrate, and a sub-pixel unit defined by intersecting of the gate line and the data line, wherein
   the sub-pixel unit comprises a thin film transistor device, a first pixel electrode layer and a second pixel electrode layer; wherein
   the first pixel electrode layer is configured as a common electrode, the second pixel electrode layer is connected to a source electrode or a drain electrode of the thin film transistor, and the first pixel electrode layer is insulated from the second pixel electrode layer;
   the second pixel electrode layer is located over the first pixel electrode layer, and strip-like pixel electrodes of the second pixel electrode layer overlap the first pixel electrode layer; and
   strip-like pixel electrodes of the second pixel electrode layer which are extended along a straight line make a tilt angle with an initial alignment of liquid crystals, and each strip-like pixel electrode has the same tilt angle with the initial alignment of liquid crystals, and the data line is parallel to one of the strip-like pixel electrodes close to the data line.

2. The TFT array substrate claimed as claim 1, wherein the tilt angle is 3°~15°.

3. The TFT array substrate claimed as claim 2, wherein the tilt angle is 7°~12°.

4. The TFT array substrate claimed as claim 1, wherein the strip-like pixel electrodes of the second pixel electrode layer are parallel to each other.

5. The TFT array substrate claimed as claim 4, wherein the data line is parallel to the strip-like pixel electrodes of the second pixel electrode layer, and the gate line is perpendicular to the initial alignment of liquid crystals.

6. The TFT array substrate claimed as claim 1, comprising a plurality of gate lines, a plurality of data lines, and a plurality of sub-pixel units defined by intersecting of the plurality of gate lines and the plurality of data lines, wherein along a direction of the initial alignment of liquid crystals, the strip-like pixel electrodes in two adjoining sub-pixel units are symmetric to each other with respect to the gate line that is interposed between the two adjoining sub-pixel units, and along a direction perpendicular to the initial alignment of liquid crystals, the strip-like pixel electrodes in two adjoining sub-pixel units are parallel to each other.

7. The TFT array substrate claimed as claim 1, wherein the first pixel electrode layer comprises a plate-like electrode.

8. A display device, comprising the TFT array substrate claimed in claim 1.

* * * * *